Nov. 24, 1931.        M. RIESNER        1,833,093
COMPRESSOR UNLOADING DEVICE
Filed Sept. 29, 1930        3 Sheets-Sheet 3
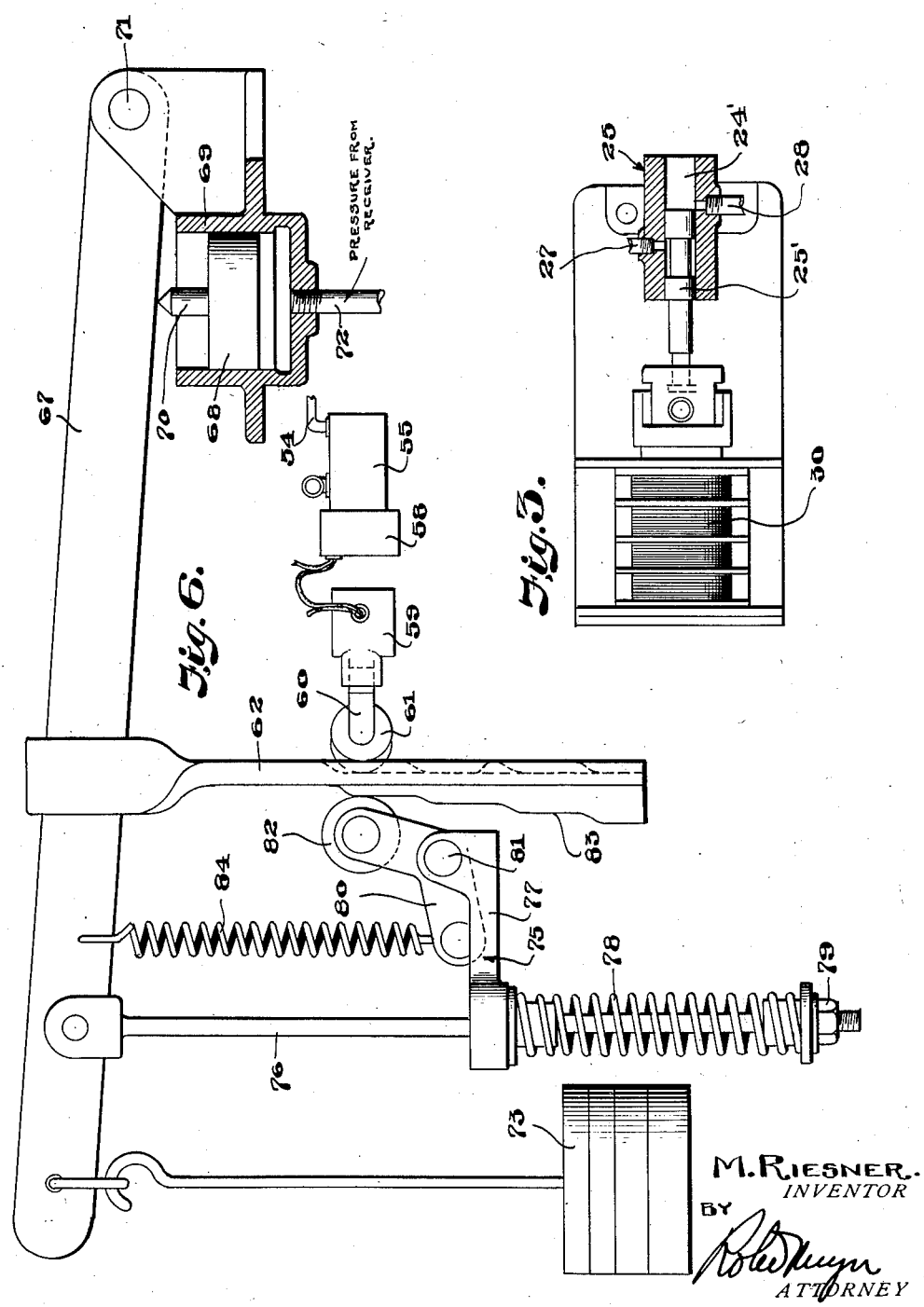

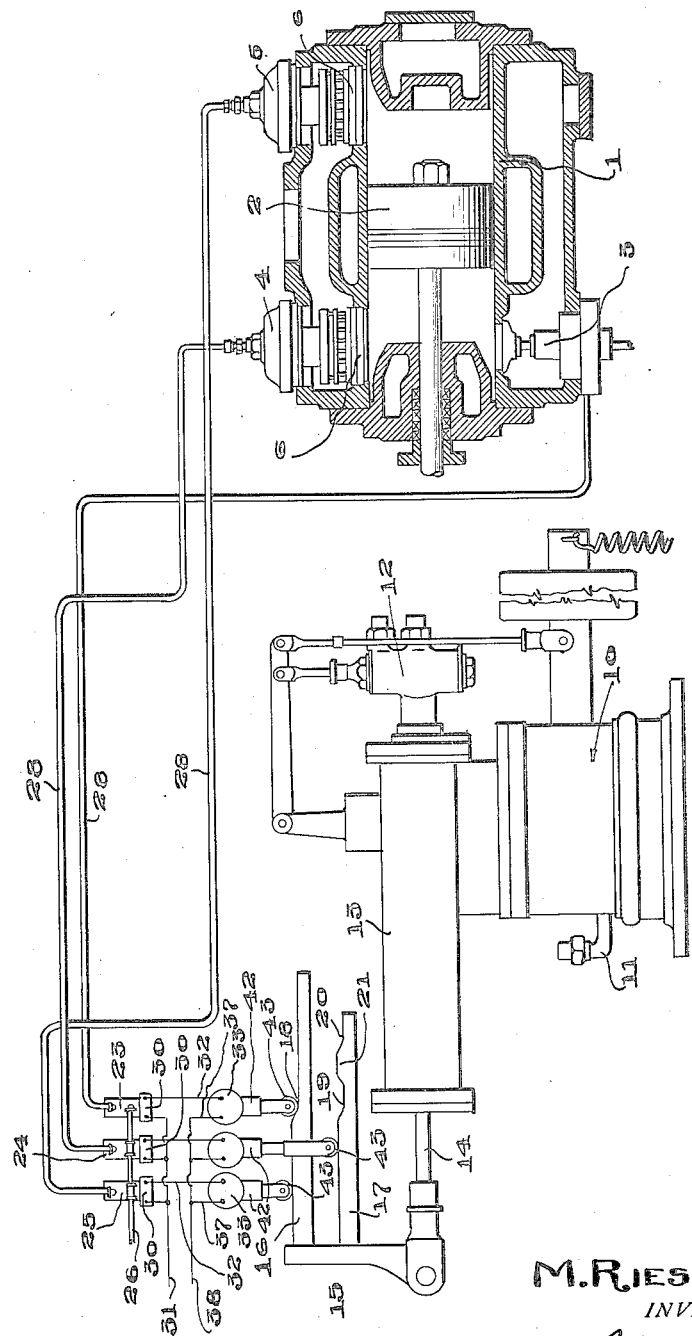

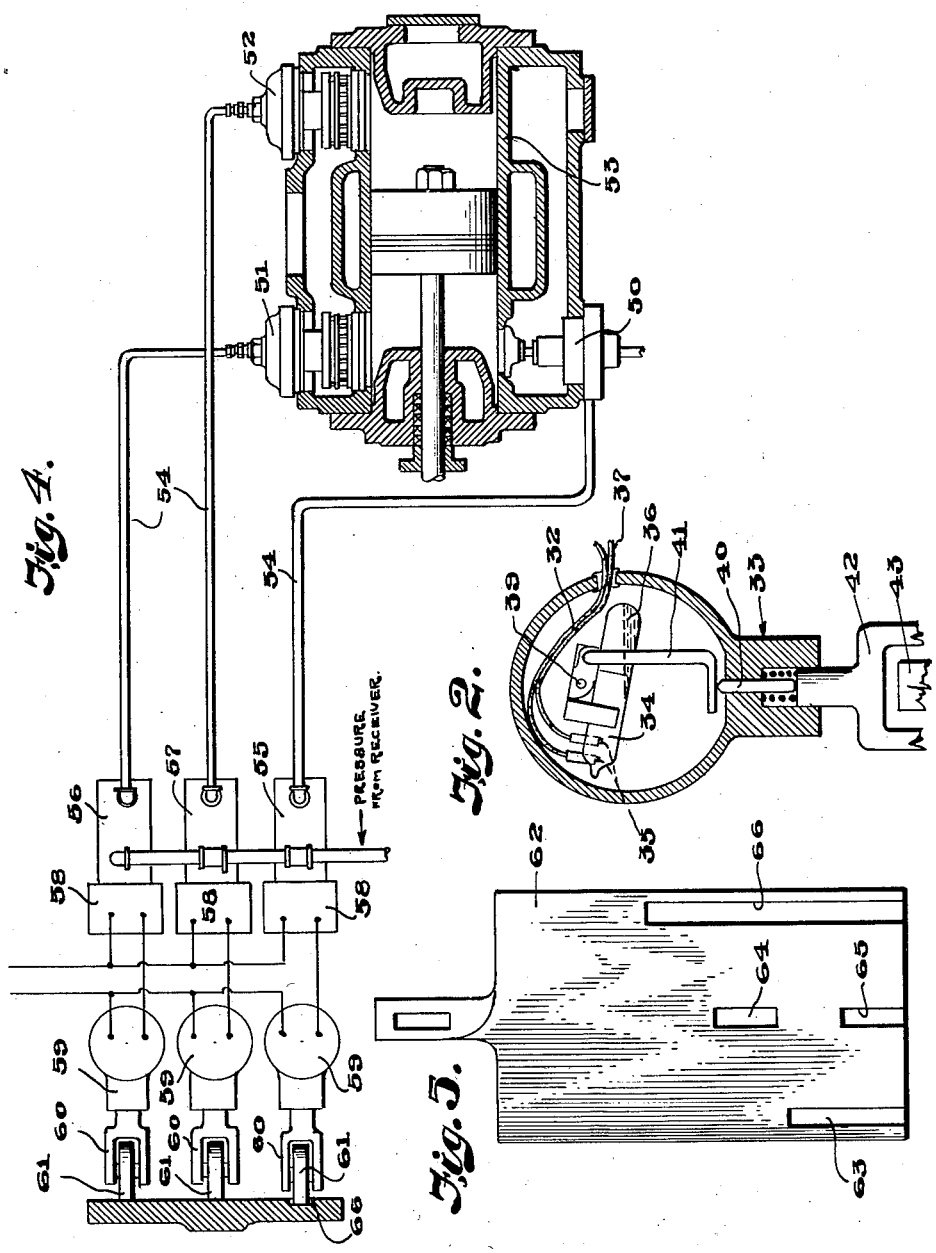

Patented Nov. 24, 1931

1,833,093

UNITED STATES PATENT OFFICE

MICHAEL RIESNER, OF CINCINNATI, OHIO, ASSIGNOR TO WORTHINGTON PUMP AND MACHINERY CORPORATION, OF NEW YORK, N. Y., A CORPORATION OF VIRGINIA

COMPRESSOR UNLOADING DEVICE

Application filed September 29, 1930. Serial No. 484,965.

This invention relates to compressors employed for compressing air, gas or analogous fluids and more particularly to a novel apparatus for regulating the unloading and loading of compressors gradually, that is, an automatic pressure regulator by means of which the volume of fluid compressed is varied automatically with the demand for fluid so as to maintain practically constant pressure and obtain the resultant advantages in compressor operation.

In variable volume compressors embodying the present invention, a series of pressure operated unloading devices are employed, each acting to control a partial unloading of the compressor cylinder or cylinders; for varying the cylinder capacity in accordance with the operation of the unloading devices and the required operation of these unloading devices is secured by a regulator acted upon by variances in pressure of the air or gas compressed in the storage tank of the unit for operating or moving of the devices in opposite directions for loading or unloading the compressor cylinder.

An object of the present invention is to provide a regulator or governor mechanism for controlling operation of said unloading devices, which regulator or governor is comparatively simple in construction, positive in operation and will eliminate indecisive or hunting action and reversing movement during any individual operation in case of pressure variances before the individual operation is completed.

More specifically, the present invention comprises a plurality of individual distributing valves for controlling the distribution of pressure fluid to the pressure operated unloading devices, which distributor valves are in turn individually operated and controlled through electrically operated means by a mechanism acted upon by the pressure of the compressed fluid in the storage tank or bottle into which the compressor discharges for actuating the various distributor valves in proper sequence upon variances of the pressure in the storage tank, such pressure varying in direct proportion to the demand for pressure fluid.

With these and other objects in view, as may appear from the accompanying specification, the invention consists of various features of construction and combination of parts which will be first described in connection with the accompanying drawings, showing a compressor unloading device of the preferred form embodying the invention. and the features forming the invention will be specifically pointed out in the claims.

In the drawings

Fig. 1 is a diagrammatic view showing the improved compressor unloading and loading control mechanism in connection with a compressor cylinder which latter is shown in section.

Fig. 2 is a detailed view partly in section of an electric switch embodied in the control apparatus.

Fig. 3 is a view partly in section and partly in elevation of one of the electrically operated pressure distributing valves.

Fig. 4 is a diagrammatic view partly in section of a modified form of the compressor control apparatus.

Fig. 5 is a detailed view in elevation of a pressure moved control bar embodied in the modified form of control apparatus and Fig. 6 is a view partly in section and partly in elevation of the modified form of the compressor control apparatus.

Referring more particularly to the drawings, an air compressor cylinder 1 is shown in Fig. 1 of the drawings in which the piston 2 reciprocates for compressing the fluid. In the form of compressor illustrated in Fig. 1, the unloading and loading or in other words, the variation in the volume of fluid compressed by the compressor is controlled by the pressure operated unloading device 3 and the pressure operated unloading devices 4 and 5 which work or operate in connection with the suction valves 6, although it is to be understood that the present governing or controlling apparatus may be employed with a compressor embodying any of the practical methods and structures for unloading without departing from the spirit of this invention and that it is not to be confined to the type of compressor utilizing the holding open of the suction valves for effecting steps in the unloading of the compressor.

The control or governing apparatus embodies a pressure actuated regulator 10 which is similar to that shown in my prior Patents 1,579,781 and 1,704,343, receiving fluid under pressure through the connection 11 for operating the pilot valve structure 12 to admit pressure fluid into the cylinder 13 for reciprocating the piston rod 14.

The piston 14 has a support bar 15 connected to its outer end which carries a pair of operating bars 16 and 17. The bar 16 is provided with single depressions as shown at 18 while the bar 17 has the depressions 19 and 20 separated by the raised portion 21. The bars 16 and 17 are moved by movement of the piston rod 14 under control of the pressure of the air or gas entering the regulator 10 through the connection 11. It is to be understood that the pipe or connection 11 may be connected to the discharge line of the compressor or to the bottle or reservoir into which the compressor discharges so as to render the regulator operative under pressure variances of the fluid compressed, for in turn regulating the loading and unloading of the compressor in accordance with the demand for pressure fluid.

The pressure operated unloading devices 3, 4 and 5 are operated by pressure fluid admitted thereto through the distributing valves 23, 24 and 25 respectively. The distributing valves 23, 24 and 25, one of which is shown in section in Fig. 3 of the drawings, comprise cylinders 24 in which valve pistons 25 reciprocate for controlling the passage of the pressure fluid into the unloading devices. The various distributor valves are preferably connected to the receiver or storage reservoir (not shown) by a pipe 26 which has branch communications or connections 27 with the cylinder. Normally the piston valve 25' is positioned as shown in Fig. 3 of the drawings to cut off communication between the pressure fluid inlets 27 and the respective outlets or pipes 28 which carries the pressure fluid from the valves to the unloading devices. It is to be understood that these unloading devices 3, 4 and 5 are of any approved construction such as those illustrated and described in my prior patents above mentioned.

The valve pistons 25' are each connected to a solenoid 30, one solenoid being provided for each of the valves as shown diagrammatically in Fig. 1 of the drawings. The solenoids 30 are connected to one of the wires 31 of an electric power supply line and each of the solenoids is connected through suitable wire connections as indicated at 32 with a switch 33.

One form of the switches 33 is illustrated in Fig. 2 of the drawings. This form, illustrated in Fig. 2 is of a mercury tube type comprising a mercury tube 34 having the spaced contacts 35 therein, which are connected to close an electric circuit by the slug of the mercury 30. When the tube is rocked to move the mercury slug 36 into engagement with the spaced contacts 35, one of these contacts 35 is connected through the wires 32 with the solenoids and the other contact is connected through the wires 37 with the other wire 38 of the power line so that when the tube 34 is rocked, to bridge the contacts 35, the solenoids 30 will be energized for holding the valve piston 25' into position to cut off the flow of pressure fluid to the unloading devices and to permit any pressure fluid which may be in the unloading devices to bleed therefrom back through the pipes 28 and out to the atmosphere through the open ends of the cylinders 24' of the valves.

As shown in Fig. 2 of the drawings. the mercury tube 34 which is rockably mounted upon the trunnion 39 is rocked by the movement of a pin 40 which engages the rocking arm 41 connected to the tube 34. The pin 40 is moved longitudinally by the yoke 42 which carries a roller 43 at its outer open end.

As shown in Fig. 1 of the drawings, the rollers 43 which are associated with the valves 23 and 25 ride over the edge of the bar 16 and consequently the tubes 34 of the switches 33 which control the energizing of the solenoids 30 of these valves 23 and 25 are rocked by the movement of the rollers on to the depression 18 of the bar 16 for permitting the breaking of the contact between contacts 35 and the consequent de-energizing of the respective solenoids 30. Upon de-energizing of the solenoids 30, their respective cores fall or move out of the coils by gravity for establishing communication between the pressure fluid inlet pipes 27 and the outlet pipes 28 to permit the delivery of pressure fluid to the respective unloading devices for unloading the compressor.

The roller 43 which is associated with the switch structure 33 that controls the energizing of the solenoids 30 of the valve structure 24, rides over the irregular or undulated surface of the bar 17 and since this bar 17 is provided with two depressions the pressure unloading device associated or connected with the valve 24 will be operated a plurality of times during each unloading or loading operation of the compressor.

The particular steps in the sequence of the loading and unloading of the compressor will not be entered into as the improved control apparatus is applicable for use in connection with any of the practical approved constructions of compressors and unloading mechanisms whether three step, five step or any number of steps are employed in the fractional loading or unloading of the compressor and while two bars 16 and 17 are illustrated in Fig. 1 of the drawings, it is to be understood that any number of bars with any desired or required number of depressions therein may be employed without departing from the spirit of the present invention.

Figs. 4, 5 and 6 of the drawings, show an alternate or modified form of the control apparatus. In this modified form, the pressure operated unloading devices 50, 51 and 52 which control the unloading and loading of the compressor 53, are connected by suitable pipes 54 with pressure fluid distributing valves 55, 56 and 57. The pressure distributing valves 55, 56 and 57 are of the same construction as that illustrated in Fig. 3 of the drawings and they are actuated by solenoids 58, the energizing of which solenoids is controlled by switches 59. The switches 59 may be of the same construction as that illustrated in Fig. 2 and control the energizing of the solenoid in the same manner as the solenoids 30 are controlled by the switch structures 33.

The yokes 60 of the switch structures 59 carry rollers 61 which engage the surface of a fluid operated bar 62 provided with depressions 63, 64, 65 and 66 into which the various rollers move at predetermined times for breaking the electric circuit through the switches 59 and solenoids 58 to permit delivery of operating pressure fluid to the unloading devices in the same manner in which the construction illustrated in Fig. 1 operates the bar 62 carried by a pivoted lever 67. The lever 67 is moved by pressure from the receiver or storage reservoir (not shown) for controlling movement of the bar 62 in accordance with the demand for fluid under pressure and this movement of the lever 67 is provided through the movement of a piston 68 which reciprocates in a cylinder 69. The piston 68 has a contact pin 70 which engages the lever 67 for moving the lever upon its pivot 71.

Fluid under pressure is admitted to the cylinder 69 beneath the piston 68 through a suitable pipe 72. A counter balancing weight 73 is connected to the free end of the lever 67 for holding down or steadying the movement of the lever.

A compensator structure 75 is provided and has a dampering effect on the pressure operated lever device comprising the piston 68 and cylinder 69 in that it increases the spring tension on the compensator lever 67, effecting an adjustment for slightly higher pressure when the lever reaches a predetermined position. The compensator structure 75 comprises a rod 76 pivotally connected to the lever 67. A spring tensioning roller support 77 is slidably mounted upon the rod 76 and engages one end of the spring 78, the tension of which is initially regulated by adjustment of the tensioning nut 79.

The support 77 has a roller arm 80 pivotally connected thereto as shown at 81. A roller 82 is carried by one end of the rocker arm 80 and engages the stepped surface 83 on the side of the bar opposite from its recessed side. The various steps in the stepped surface 83 correspond to the depressions 63 to 66 inclusive, in the bar 62 and as the roller 82 engages these various stepped surfaces, it will rock the rocker arm 80, increasing the tension of the spring 78 and consequently increase the tension on the lever 67 and as the roller rides on the higher stepped surfaces, will have the same effect as adjusting the complete regulator or control apparatus for slightly higher pressure when the lever 67 reaches certain positions. The roller 82 is held in engagement with the stepped surface 83 by the spring 84.

It will be understood that the invention is not to be limited to the specific construction or arrangement of parts shown but that they may be widely modified within the invention defined by the claims.

What is claimed is:—

1. The combination with a variable volume air or gas compressor, of pressure operated unloading devices for loading and unloading the compressor, distributor valves for controlling admission of pressure fluid to said unloading devices, a solenoid connected to each of said distributor valves for operating them, switches for controlling energizing of said solenoids and a bar having an undulating surface and moved upon variances in pressure of fluid compressed for operating said switches.

2. In a variable volume compressor, the combination with a cylinder, of a plurality of pressure operated unloading devices, each acting to partly unload the cylinder, a pressure distributor valve connected to each of said unloading devices, independent electric operating means associated with each of said valves, and means for successively operating one of said electric operating means a plurality of times during each cylinder unloading and loading operation.

3. In a variable volume compressor, the combination with a cylinder, of a plurality of pressure operated unloading devices, each acting to partly unload the cylinder, a pressure distributing valve connected to each of said unloading devices, independent electric operating means associated with each of said valves, and a bar having an undulating surface and moved upon variances in pressure of fluid pumped for operating said electrical operating means.

4. In a variable volume compressor, the combination with a cylinder, of a plurality of pressure operated unloading devices, each acting to partly unload the cylinder, a pressure distributing valve connected to each of said unloading devices, independent electric-operating means associated with each of said valves, a bar having an undulating surface and moved upon variances in pressure of fluid pumped for operating said switches, and a compensator structure associated with said bar for automatically adjusting it to required slightly higher pressure to operate the valves at predetermined times.

5. In a variable volume compresser, the combination with a cylinder, of a plurality of pressure operated unloading devices, each acting to partly unload the cylinder, a pressure distributing valve connected to each of said unloading devices, independent electric operating means associated with each of said valves, said valves closed to prevent passage of operating pressure fluid to said unloading devices when said electrically operated means is energized, a bar moved by variances in pressure of fluid compressed for breaking an electric circuit through said electrically operated means, and pressure responsive means for moving said bar.

6. In a variable volume compresser, the combination with a cylinder, of a plurality of pressure operated unloading devices, each acting to partly unload the cylinder, a pressure distributing valve connected to each of said unloading devices, independent electric operating means associated with each of said valves, said valves closed to prevent passage of operating pressure fluid to said unloading devices when said electrically operated means is energized, switches for controlling energizing of said electrically operated means, a bar having an undulating surface for controlling operation of said switches, and means moved upon variances in pressure of fluid compressed for moving the bar.

7. In a variable volume compressor, the combination with a cylinder, of a plurality of pressure operated unloading devices, each acting to partly unload the cylinder, a pressure distributing valve connected to each of said unloading devices, independent electric operating means associated with each of said valves, said valves closed to prevent passage of operating pressure fluid to said unloading devices when said electrically operated means is energized, switches for controlling energizing of said electrically operated means, a bar having an undulating surface for controlling operation of said switches, a lever moved upon variances of fluid compressed for moving said bar, means for tensioning said lever, and means for varying the tension on the lever to provide automatic adjustment for regulating the pressure required to move the lever at certain times.

8. In a variable volume compressor, the combination with a cylinder, of a plurality of pressure operated unloading devices, each acting to partly unload the cylinder, a pressure distributing valve connected to each of said unloading devices, independent electric operating means associated with each of said valves, said valves closed to prevent passage of operating pressure fluid to said unloading devices when said electrically operated means is energized, switches for controlling energizing of said electrically operated means, a bar having an undulating surface for controlling operation of said switches, a lever moved upon variances in pressure of fluid compressed for moving said bar, a tensioning spring connected to said lever, and means for regulating the tension of said spring and operated by movement of said bar for varying the tension on the lever for indirectly varying the pressure in which the lever is moved.

9. In a variable volume compressor, the combination with a cylinder of a plurality of pressure operated unloading devices each acting to partly unload the cylinder, a pressure distributor valve connected to each of said unloading devices, independent electric operating means associated with each of said valves, and means having an undulating surface movable upon variances in pressure of fluid pumped for controlling energizing of said electrical means.

10. In a variable volume compressor, the combination with a cylinder, of a plurality of pressure operated unloading devices each acting to partly unload the cylinder, a pressure distributor valve connected to each of said unloading devices, independent electric operating means associated with each of said valves, and means having an undulating surface movable upon variances in pressure of fluid pumped for successively operating one of said electric operating means a plurality of times during each cylinder unloading and loading operation.

11. In a variable volume compressor, the combination with a cylinder, of a plurality of pressure operated unloading devices each acting to partly unload the cylinder, a pressure distributing valve connected to each of said unloading devices, independent electric operating means associated with each of said valves, means having an undulating surface movable upon variances in pressure of fluid pumped for controlling energizing of said electrical means, and a compensator structure associate with said last named means for automatically adjusting it to increase or decrease the pressures required for operating said means.

In testimony whereof I affix my signature.

MICHAEL RIESNER.